US012748290B2

(12) United States Patent
Duveau et al.

(10) Patent No.: US 12,748,290 B2
(45) Date of Patent: Sep. 29, 2026

(54) IMAGING OPTICAL SYSTEM COMPRISING THREE MIRRORS

(71) Applicant: OFFICE NATIONAL D'ETUDES ET DE RECHERCHES AÉROSPATIALES, Palaiseau (FR)

(72) Inventors: Louis Duveau, Palaiseau (FR); Guillaume Druart, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 478 days.

(21) Appl. No.: 18/258,181

(22) PCT Filed: Dec. 14, 2021

(86) PCT No.: PCT/FR2021/052314
§ 371 (c)(1),
(2) Date: Jun. 16, 2023

(87) PCT Pub. No.: WO2022/129770
PCT Pub. Date: Jun. 23, 2022

(65) Prior Publication Data

US 2024/0111137 A1 Apr. 4, 2024

(30) Foreign Application Priority Data

Dec. 17, 2020 (FR) ...................................... 2013568

(51) Int. Cl.
*G02B 17/06* (2006.01)
*G02B 23/06* (2006.01)

(52) U.S. Cl.
CPC ......... *G02B 17/0642* (2013.01); *G02B 23/06* (2013.01)

(58) Field of Classification Search
CPC . G02B 17/0642; G02B 17/0626; G02B 23/06
(Continued)

(56) References Cited

U.S. PATENT DOCUMENTS

| | | | | |
|---|---|---|---|---|
| 4,598,981 A * | 7/1986 | Hallam | G02B 17/0636 | 396/296 |
| 8,248,693 B2 * | 8/2012 | Cook | G02B 17/0636 | 359/861 |

(Continued)

FOREIGN PATENT DOCUMENTS

| | | | | |
|---|---|---|---|---|
| FR | 3042042 A1 | 4/2017 | | |
| JP | 2004126510 A * | 4/2004 | | G02B 17/0642 |

(Continued)

OTHER PUBLICATIONS

A. Bauer et al., "Concurrent engineering of a next generation freeform telescope: optical design", downloaded from: https://www.spiedigitallibrary.org/conference-proceedings-of-spie, downloaded Oct. 1, 2019, 9 pages, The Institute of Optics.

(Continued)

*Primary Examiner* — Bumsuk Won
*Assistant Examiner* — Samanvitha Sridhar
(74) *Attorney, Agent, or Firm* — Maier & Maier, PLLC

(57) ABSTRACT

An imaging optical system including three mirrors has a configuration adapted to block stray rays which could otherwise reach an image sensor of the system, while permitting large fields, high apertures, and good system compactness. The system may also incorporate two entrance baffles which are arranged one on either side of an optical entrance of the system. Functions of the two entrance baffles may be limited to intercepting rays originating from fields which are angularly distant from the entrance field useful to each captured image. The two entrance baffles can thus have reduced lengths upstream, so that the system has a small size.

13 Claims, 6 Drawing Sheets

(58) Field of Classification Search
USPC ................................ 359/850, 857, 858, 859
See application file for complete search history.

(56) References Cited

U.S. PATENT DOCUMENTS

| | | | | |
|---|---|---|---|---|
| 2012/0038812 | A1* | 2/2012 | Neil | G02B 17/0642 348/340 |
| 2015/0346022 | A1 | 12/2015 | Yang et al. | |
| 2018/0157016 | A1* | 6/2018 | Zhu | G02B 17/0642 |

FOREIGN PATENT DOCUMENTS

| | | | |
|---|---|---|---|
| JP | 2008309838 | A | 12/2008 |
| WO | 8805552 | A1 | 7/1988 |
| WO | 2020038895 | A1 | 2/2020 |

OTHER PUBLICATIONS

International Search Report w/English translation and Written Opinion of the ISA for PCT/FR2021/052314 mailed Jun. 21, 2022, 21 pages.

J. Rolland et al., "Pamplemousse: The optical design, fabrication, and assembly of a three-mirror freeform imaging telescope", downloaded from: https://www.spiedigitallibrary.org/conference-proceedings-of-spie, downloaded on Jun. 12, 2023, 7 pages.

W. Michaeli et al., "Geometrical Accuracy and Optical Performance of Injection Moulded and Injection-compression Moulded Plastic Parts", Annals of the CIRP, vol. 56, No. 1, 2007, 4 pages.

K. Feurschbach et al., "A new family of optical systems employing φ-polynomial surfaces", Optics Express, vol. 19, No. 22, Oct. 24, 2011, 10 pages.

* cited by examiner

IMAGING OPTICAL SYSTEM COMPRISING THREE MIRRORS

CROSS-REFERENCE TO RELATED APPLICATIONS

This application is the U.S. national phase of International Application No. PCT/FR2021/052314 filed Dec. 14, 2021, which designated the U.S. and claims priority to FR 2013568 filed Dec. 17, 2020, the entire contents of each of which are hereby incorporated by reference.

TECHNICAL FIELD

This description relates to an imaging optical system comprising three mirrors, as well as to an optronic imaging device that comprises such a system.

PRIOR ART

Imaging optical systems comprising three mirrors are used for many applications. In particular, these systems can be telescope-type systems, and the article entitled "Concurrent engineering of a next-generation freeform telescope: optical design" by A. Bauer et al., Proc. of SPIE, Vol. 10998, May 14, 2019, pp. 109980W-1 to 109980W-8, proposes several new configurations of imaging optical systems, each composed of three freeform mirrors. General challenges concerning imaging optical systems are in particular their size and the possibility of reducing the amount of stray light which is superimposed on images formed by the mirrors. It is common practice to use one or more baffles arranged in a manner appropriate for reducing the amount of stray light which reaches the image sensor of such an imaging optical system, but some of these baffles, in particular those that are the most efficient, significantly increase the size of the system. In addition to increasing its size, such baffles also increase the rotational inertia of the imaging optical system during rotations applied in order to scan a large scene to be captured in several successive images. One application of imaging optical systems which requires rapid rotation of these systems, with high angular accelerations, is the supplying of optronic pods for surveillance and detection which are intended to be carried on board aircraft, for example on board helicopters or drones. It is therefore important to obtain low levels of stray light in the captured images, while simultaneously having the baffles that are incorporated into the imaging optical system be as small as possible.

[FIG. 1] is a diagram of one of the configurations that are mentioned in the article by A. Bauer et al. cited above. Such imaging optical system, denoted overall by reference number 1, is of the type comprising three mirrors, including a primary mirror, denoted M1, a secondary mirror, denoted M2, and a tertiary mirror, denoted M3. These mirrors are adapted and arranged so that light rays originating from a scene located in an entrance field of the system are reflected first by mirror M1, then by mirror M2, and then by mirror M3, to form an image of the scene in a focal plane of the system, denoted PF. Thus, any light ray which originates from the scene and which contributes to forming the image is divided into an initial segment upstream of mirror M1, a first intermediate ray segment between mirror M1 and mirror M2, a second intermediate ray segment between mirror M2 and mirror M3, and a terminal ray segment between mirror M3 and the focal plane PF. Secondary mirror M2 may be convex and tertiary mirror M3 may be concave. The direction of curvature of primary mirror M1 may vary according to the location on this mirror. The three mirrors M1, M2 and M3 have freeform reflective surfaces. In a known manner, a freeform surface is one not contained in any surface having rotational symmetry.

Throughout this description, the terms upstream and downstream are defined relative to the direction of propagation of the rays which originate from the scene and which form the image in focal plane PF. Furthermore, the term parabasal ray, or chief ray, is used to refer to the light ray which originates from the scene and contributes to the image in focal plane PF by passing through a center of the entrance pupil of system 1, with an angular deviation of zero relative to the optical axis of the system. In [FIG. 1], the parabasal ray is designated by the reference RP, its initial segment by the reference $RP_0$, its first and second intermediate segments by the references $RP_1$ and $RP_2$ respectively, and its terminal segment by the reference $RP_3$. A light ray which originates from an element of the scene located at the boundary of the entrance field of system 1, and which passes through an edge of the entrance pupil of the system, is called a field edge marginal ray.

In the system of [FIG. 1], mirrors M1 and M2 are oriented so that second intermediate segment $RP_2$ of parabasal ray RP intersects its initial segment $RP_0$. This configuration of mirrors M1 and M2 is called the α configuration. Furthermore, mirrors M2 and M3 are oriented so that terminal segment $RP_3$ of parabasal ray RP passes by a lateral side of mirror M2 which is opposite to a lateral offset of mirror M1 relative to mirror M2. In this manner, terminal segment $RP_3$ of parabasal ray RP does not intersect the ray's first intermediate segment $RP_1$. This configuration of mirrors M2 and M3 is called the z configuration. Thus, system 1 has an overall optical configuration which is called the α-z configuration.

System 1 further comprises an image sensor 2 which is arranged so that a photosensitive surface S of this image sensor is superimposed on focal plane PF. Photosensitive surface S extends from an upstream boundary $L_{AM}$ to a downstream boundary $L_{AV}$, the upstream $L_{AM}$ and downstream $L_{AV}$ boundaries of photosensitive surface S of image sensor 2 being defined in relation to respective projections of these boundaries onto the initial segment of parabasal ray $RP_0$ and in relation to the direction of propagation of parabasal ray RP in this initial segment.

Technical Problem

From this situation, an object of the present invention is to propose a new imaging optical system for which the amount of stray light which reaches the image sensor is reduced.

An additional object of the invention is that the imaging optical system has a small size.

Another additional object of the invention is that the imaging optical system can have a large entrance field, and/or have a large entrance pupil.

Yet another object of the invention is that the imaging optical system can be manufactured at low cost.

SUMMARY OF THE INVENTION

To achieve at least one of these or other objects, a first aspect of the invention proposes an imaging optical system comprising three mirrors of the type described above, wherein the secondary and tertiary mirrors are oriented so that the upstream boundary of the photosensitive surface of the image sensor is offset downstream relative to a straight line which connects an upstream edge of the primary mirror to an upstream edge of the secondary mirror, or to an upstream edge of a screen which surrounds the secondary mirror. In this manner, the secondary mirror or the screen which surrounds it intercepts rays which would otherwise propagate in a straight line directly from the primary mirror to the photosensitive surface of the image sensor.

In accordance with the convention indicated above, the upstream and downstream edges of the primary mirror, respectively of the secondary mirror, are defined in relation to their respective projections onto the initial segment of the parabasal ray and in relation to the direction of propagation of the parabasal ray in this initial segment. Similarly, the downstream offset of the upstream boundary of the photosensitive surface of the image sensor is parallel to the initial segment of the parabasal ray and oriented in accordance with the direction of propagation of the parabasal ray in this initial segment.

Such configuration of the system, in which the secondary mirror is therefore located between the image sensor and the primary mirror, makes it possible to block any stray light that would otherwise reach the image sensor by coming directly from the primary mirror, in particular such rays which would enter through the optical entrance of the system and be reflected by the primary mirror towards the image sensor.

According to an improvement of the invention, the system may further comprise a first entrance baffle which is superimposed on initial segments of first field edge marginal rays, on the same first side of the entrance field as the image sensor, opposite to the tertiary mirror. In this case, this first entrance baffle may have a downstream edge which joins terminal segments of second field edge marginal rays. These second field edge marginal rays may be opposite to the first field edge marginal rays in a beam of rays which enters the system and forms the image, in particular when the system has a plane of symmetry which is common to the three mirrors. Such first entrance baffle blocks some of the light that would otherwise enter the system through its optical entrance, oriented directly towards the image sensor. In addition, this first entrance baffle can have a length, starting from its downstream edge, such that an upstream edge of this first entrance baffle intercepts rays which would otherwise enter the system through its optical entrance towards the tertiary mirror, and would be reflected by this tertiary mirror towards the image sensor.

Thanks to the features of the invention, according to which the upstream boundary of the photosensitive surface of the image sensor is offset downstream relative to the straight line which connects the respective upstream edges of the primary and secondary mirrors, the first entrance baffle can have a reduced length parallel to the initial segment of the first field edge marginal ray. The size of the system including the first entrance baffle is thus reduced.

According to a complementary improvement of the invention, the system may further comprise a second entrance baffle which is superimposed on initial segments of the second field edge marginal rays, on the same second side of the entrance field as the tertiary mirror, opposite to the image sensor. Then, this second entrance baffle may have a downstream edge which is connected to an upstream edge of the tertiary mirror, or to a screen which surrounds this tertiary mirror, or to an opaque mount for the tertiary mirror. Alternatively, the downstream edge of the second entrance baffle may be located downstream of a straight line which connects the upstream boundary of the photosensitive surface of the image sensor to the downstream edge of the first entrance baffle. Such a second entrance baffle additionally reduces the light that would otherwise enter the system through its optical entrance, directed directly towards the image sensor.

Preferably, the second entrance baffle can have an upstream edge which is located upstream of a straight line which connects the downstream edge of the first entrance baffle to the downstream boundary of the photosensitive surface of the image sensor. Thus, the first and second entrance baffles cooperate to intercept all the light rays which would otherwise enter the system through its optical entrance, directed directly towards the image sensor or towards the tertiary mirror.

Again thanks to the features of the invention, according to which the upstream boundary of the photosensitive surface of the image sensor is offset downstream relative to the straight line which connects the respective upstream edges of the primary and secondary mirrors, the second entrance baffle can have a reduced length parallel to the initial segments of the second field edge marginal rays. The size of the system, including the second entrance baffle, is thus also reduced.

In preferred embodiments of the invention, at least one of the following additional features may optionally be reproduced, alone or with several of them combined:

- at least one among the primary mirror, the secondary mirror, and the tertiary mirror may have a freeform reflective surface;
- a longitudinal dimension of the image sensor determines a first angle of view of the system, and the system can be adapted so that this first angle of view is greater than or equal to 9° (degrees), preferably greater than or equal to 18°. The entrance field of the system can thus be large, while preferably being less than 45°;
- the image sensor may have a matrix arrangement, in which case a transverse dimension of the image sensor, which is perpendicular to its longitudinal dimension, determines a second angle of view of the system. In this case, the system can also be adapted so that the second angle of view is greater than or equal to 12°, preferably greater than or equal to 24°, and preferably less than 60°;
- the system may have an aperture number value N which is less than 5, preferably less than 2, the aperture number N being equal to f/D where f is the focal length of the system and D is a dimension of the entrance pupil of the system. The value of the aperture number N can therefore be such that the entrance pupil of the system is large;
- the value of the focal length f may be less than or equal to 100 mm, preferably less than or equal to 20 mm, and greater than 2 mm;
- the image sensor may be of a type which is sensitive to at least part of a spectral interval which extends from 360 nm (nanometers) to 14 μm (micrometers), in the wavelength values of the rays originating from the scene. In particular, the image sensor may be a thermal sensor of the bolometer or microbolometer type;
- the system may further comprise a pupillary diaphragm, this pupillary diaphragm being located at the primary mirror or at the tertiary mirror, preferably at the tertiary mirror. For these two positions of the pupillary diaphragm, it can have an opening shape which is simple, in particular circular, square, or rectangular. Furthermore, its size is smaller when it is located at the tertiary mirror. Advantageously, the pupillary diaphragm can be formed by the peripheral edge of the primary mirror or tertiary mirror;

the system may further comprise a spectral separation device which is arranged between the tertiary mirror and the image sensor, and an additional image sensor which is arranged in an image of the focal plane of the system, said image having been formed by the spectral separation device;

the primary, secondary, and tertiary mirrors can be contained in a sphere which has a diameter of between 2 and 6 times the value of the focal length f of the system; and at least one among the primary, secondary, and tertiary mirrors may comprise a rigid part made of an injected polymer-based material, and optionally a reflective metal layer.

Finally, a second aspect of the invention proposes an optronic imaging device which comprises a system in accordance with the first aspect indicated above. This device may be, although these are without limitation, an airborne vehicle homing device, a thermal camera, a vision assistance device, or an optronic pod for surveillance and detection.

BRIEF DESCRIPTION OF FIGURES

The features and advantages of the invention will become more clearly apparent in the following detailed description of some non-limiting embodiments, with reference to the appended figures, which include.

DETAILED DESCRIPTION OF THE INVENTION

For clarity, the dimensions of the elements shown in these figures do not correspond to actual dimensions nor to actual dimensional ratios. Furthermore, identical references which are indicated in different figures designate elements which are identical or which have identical functions. It can be assumed that the plane of the figures constitutes a plane of symmetry of the imaging optical systems which are represented, although such symmetry is not essential to the invention. Indeed, the three mirrors of each system can be angled such that the segments of the parabasal ray are not coplanar.

Figure 1:
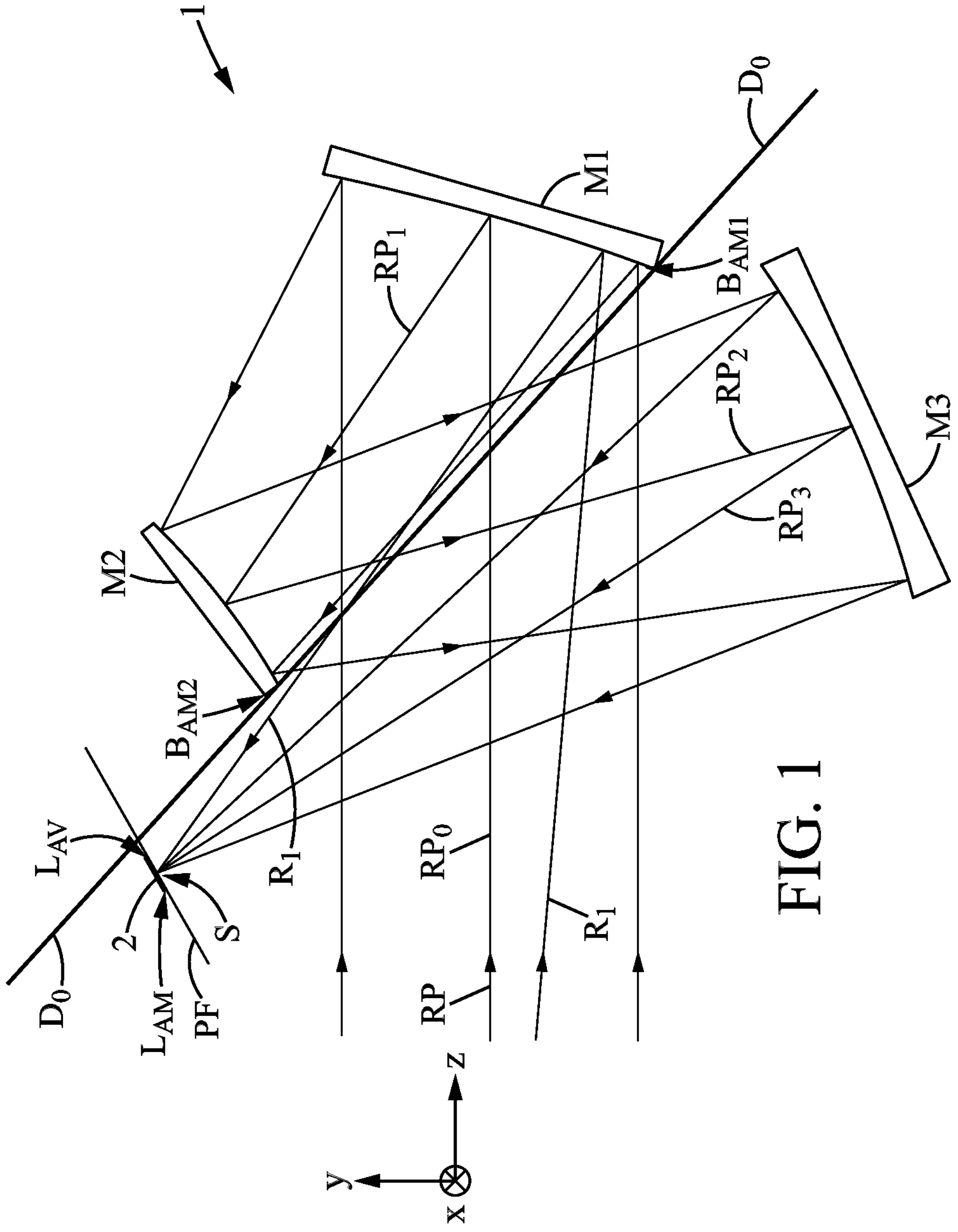
FIG. 1 is an optical diagram of an imaging optical system as known prior to the present invention.
Figure 4:
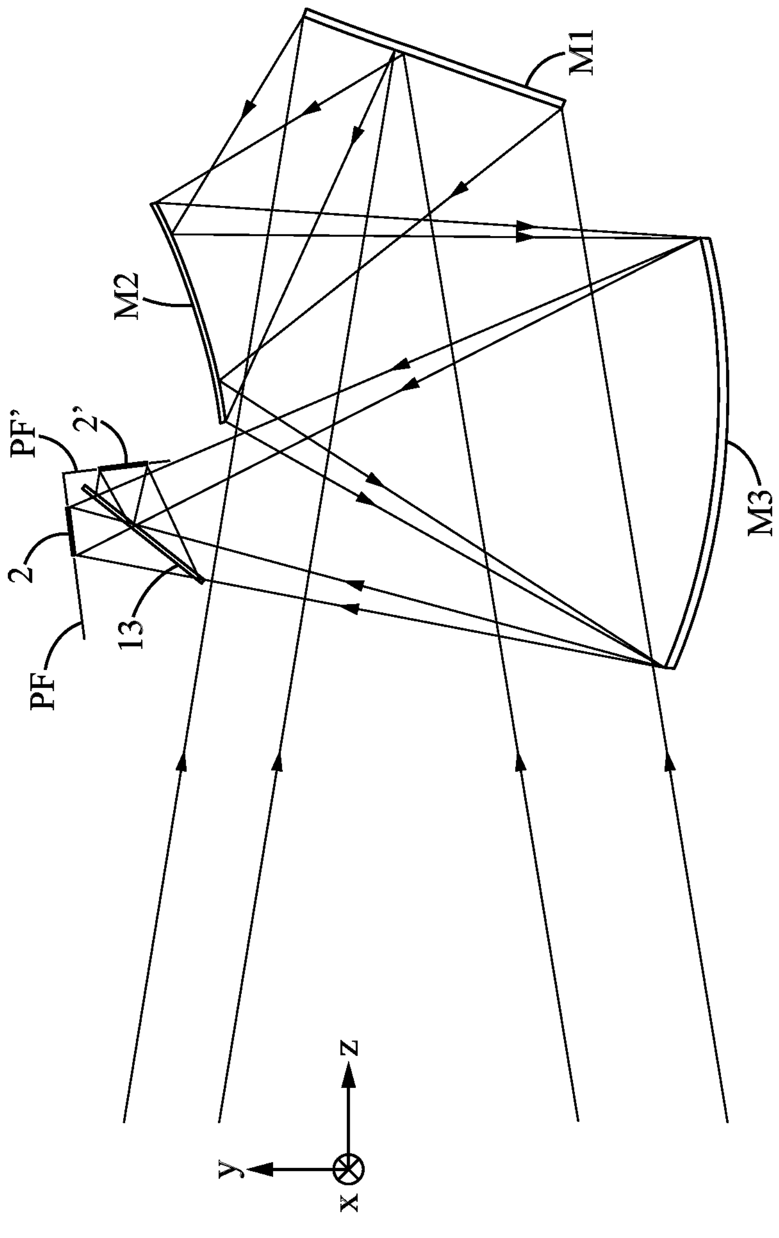
FIG. 4 corresponds to [FIG. 2] for an improvement of the invention.

In [FIG. 1]-[FIG. 4], the direct orthogonal coordinate system x, y, z is such that the x axis is perpendicular to the plane of the figures, the z axis is parallel to the initial segment $RP_0$ of the parabasal ray RP and is oriented in the direction of propagation of the ray on this segment, and the y axis is oriented so that the terminal segments of the rays which contribute to the image formed in the focal plane PF, oriented according to the direction of propagation of these rays, have projections on the y axis which are positively oriented. The y-z plane, which is the plane of the figures, may be a plane of symmetry of system 1, including a plane of symmetry of the reflecting surface of each of mirrors M1, M2, and M3. The terms upstream and downstream are defined in relation to the z axis, by comparing the respective positions of the projections of the boundaries or edges of optical components on this z axis. In particular, downstream edge $B_{AV1}$, respectively $B_{AV2}$, is opposite to upstream edge $B_{AM1}$, resp. $B_{AM2}$, for mirror M1, resp. M2.

The straight line $D_0$ which is indicated in [FIG. 1] connects the upstream edges of mirrors M1 and M2, which are denoted $B_{AM1}$ and $B_{AM2}$ respectively. It shows that the image sensor 2 is at least partly offset upstream of this line $D_0$, still in relation to the z axis. Because of these relative positions of line $D_0$ and image sensor 2, stray light can propagate directly from mirror M1 to image sensor 2. This stray light may originate from the scene which the optical entrance of system 1 is facing, be reflected by mirror M1 towards image sensor 2, then reach image sensor 2 directly by passing by the upstream side of mirror M2. The reference $R_1$ in [FIG. 1] denotes a ray of this stray light. As this ray of stray light $R_1$ has a slight inclination relative to the optical axis of system 1 at its optical entrance, meaning a slight inclination relative to the z axis before being reflected by mirror M1, its elimination by a field edge mask placed at the optical entrance of system 1 would require this mask to have a great length in the direction upstream of the optical entrance.

Figure 2:
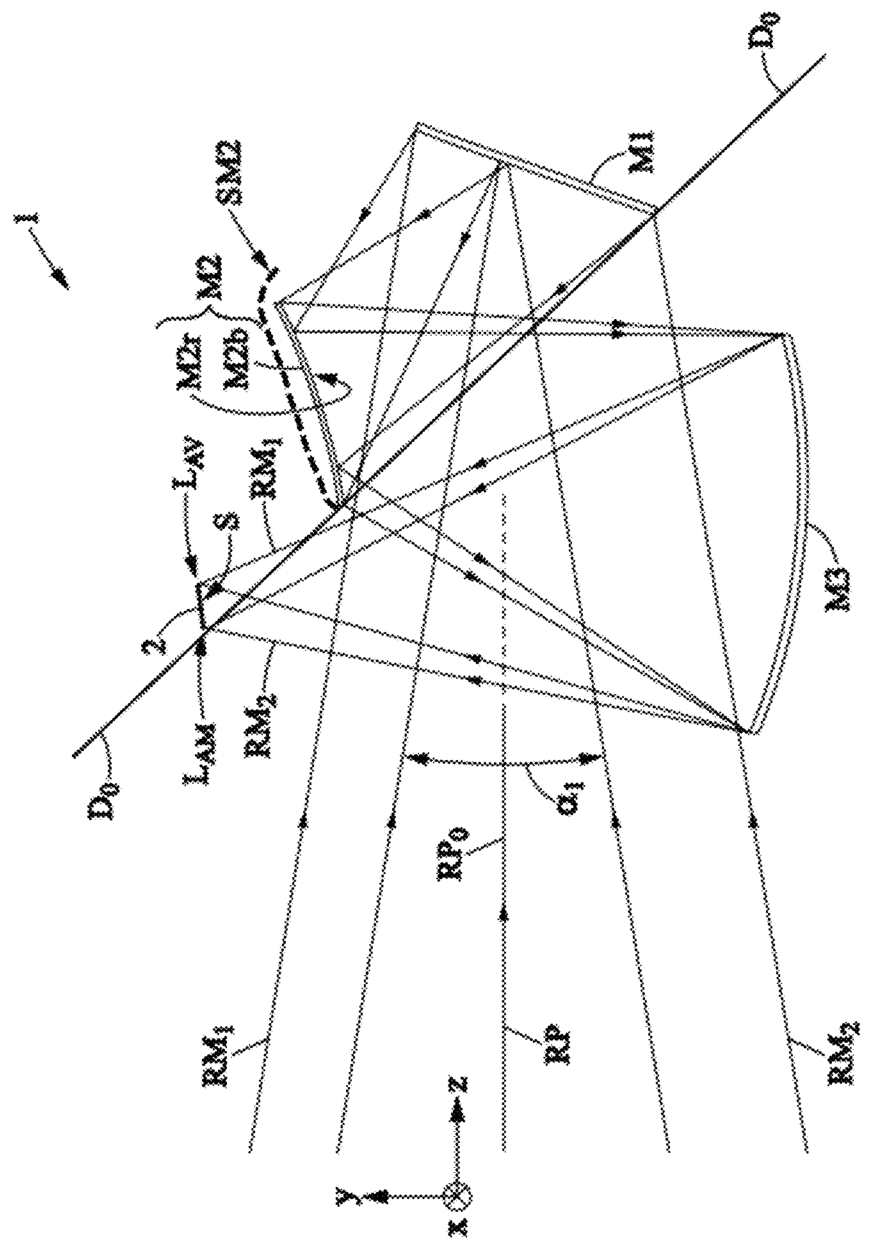
FIG. 2 is an optical diagram of an imaging optical system according to the present invention.

FIG. 2 shows a system 1 of the same type as that of [FIG. 1], but as modified by the present invention. In the invention, mirrors M2 and M3 are positioned and inclined so that photosensitive surface S of image sensor 2 is fully offset upstream relative to line D.sub.0. Put another way, upstream boundary L.sub.AM of photosensitive surface S is located on the downstream side of line D.sub.0. In this manner, stray light can no longer propagate directly from mirror M1 to image sensor 2: rays similar to ray R.sub.1 are all blocked by the invention. Obviously, the upstream edge of mirror M2 can be replaced to define line D.sub.0 by an upstream edge of a peripheral screen SM2 of mirror M2 which extends said mirror upstream.

In system 1 of [FIG. 2], mirror M3 constitutes the entrance pupil.

For the embodiment of the invention of [FIG. 2], the dimension of photosensitive surface S of image sensor 2 which appears in the y-z plane of the figure, is such that the associated angle of view is equal to 18°. In the general part of this description, this dimension of photosensitive surface S has been called the longitudinal dimension, and the associated angle of view has been called the first angle of view. This first angle of view is denoted $\alpha_1$ below.

Image sensor 2 may be of the matrix type, in which case its photosensitive surface S has another dimension which is parallel to the x axis. This other dimension has been called the transverse dimension of photosensitive surface S in the general part of this description. For the embodiment of [FIG. 2], this transverse dimension of photosensitive surface S of image sensor 2 is such that the associated angle of view, called the second angle of view, is equal to 24°. Thus, system 1 of [FIG. 2] has a large total field: 18°×24°. However, it is possible to obtain larger or smaller fields with such a configuration of the imaging optical system. In accordance with the embodiment described here, when photosensitive surface S of image sensor 2 is rectangular, this image sensor is preferably oriented so that the largest lateral dimension of its photosensitive surface is perpendicular to the plane of symmetry of system 1, i.e. perpendicular to the plane of [FIG. 2].

For the embodiment of [FIG. 2] which is shown as an example, image sensor 2 has 240 pixels of 12 μm (micrometers) each, in its longitudinal dimension, and 320 pixels in its transverse dimension. The focal length value f of system 1 is equal to 9 mm (millimeters), and its aperture number N is equal to 1.5, corresponding to an entrance pupil size of 6 mm.

Figure 3A:
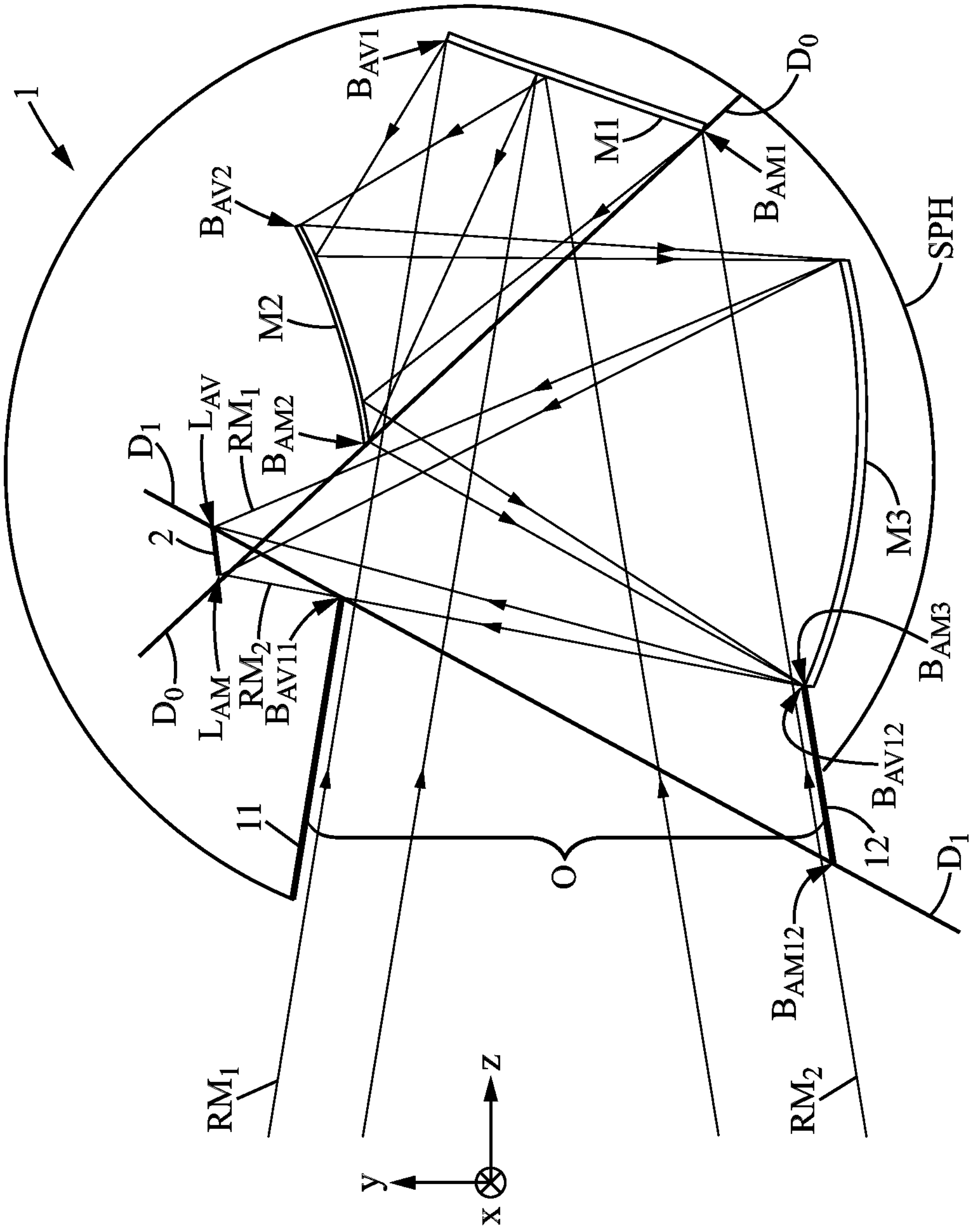
FIG. 3*a* corresponds to [FIG. 2] while illustrating features of the invention.
Figure 3B:
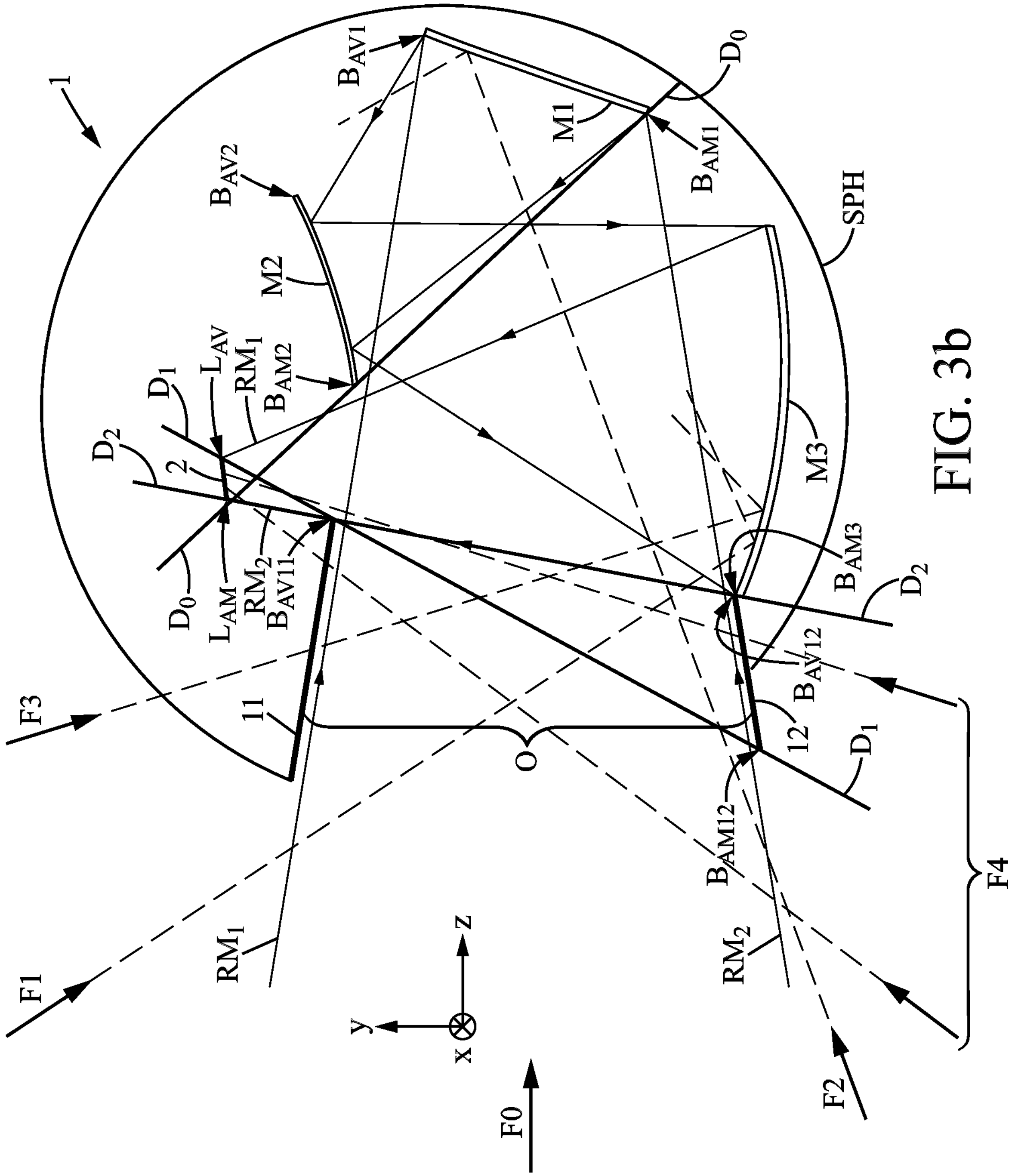
FIG. 3*b* corresponds to [FIG. 3*a*] in order to illustrate other features of the invention.
Figure 5:
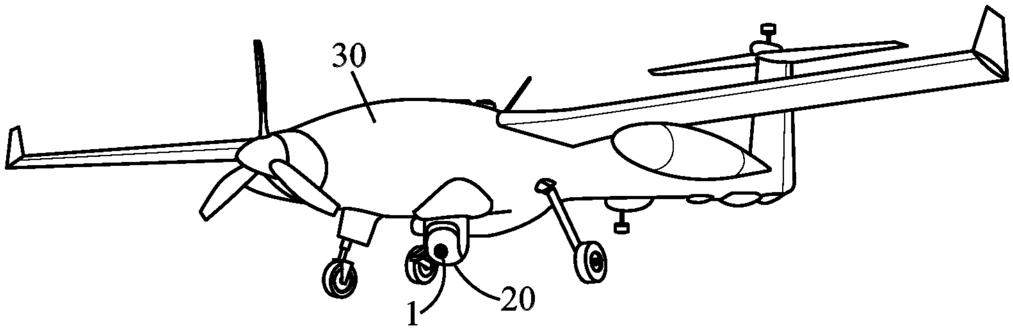
FIG. 5 shows an optronic imaging device which incorporates the system of [FIG. 2].

[FIG. 3*a*] and [FIG. 3*b*] repeat the same embodiment of the invention as [FIG. 2] while showing that the three mirrors M1, M2 and M3 of system 1, as well as the image sensor 2, are contained within a sphere of a diameter equal to 40 mm, designated by SPH. System 1 is thus particularly compact, and suitable for incorporation into optronic imaging devices such as airborne vehicle homing devices, thermal cameras, vision assistance devices, and optronic pods for surveillance and detection. [FIG. 5] shows such an optronic pod for surveillance and detection, designated by the reference 20, which is carried on board a drone 30 and which incorporates system 1.

In some possible embodiments of the invention, some or all of the optical components of system 1 may be made by three-dimensional printing, commonly called 3D printing.

In other possible embodiments, some or all of the optical components of system 1 may be made of a polymer-based material that is injected. Such other embodiments can have particularly low cost prices. In addition, at least one of mirrors M1, M2, and M3 which is thus formed by injection may be directly produced with a self-positioning system for the mirror.

Each of mirrors M1, M2, and M3 may be composed of a base part which is rigid and which provides the shape of its reflective surface, and of a reflective metal layer which is deposited on its surface. The rigid base part may be made of solid 3D-printed material, or may be based on injected polymers. For mirror M2, the base part and the reflective layer of this mirror are designated by the references M2*b* and M2*r* respectively in [FIG. 2].

[FIG. 3*a*] and [FIG. 3*b*] further show two entrance baffles which are added to system 1 to further reduce the amount of stray light that could otherwise reach image sensor 2. The entrance baffle, which is designated by the reference 11, has been called first entrance baffle in the general part of this description, and the one designated by the reference 12 has been called the second entrance baffle. The optical entrance of system 1 is designated by the reference O. Entrance baffle 11 is located on the edge of optical entrance O which is close to image sensor 2, and entrance baffle 12 is located on the edge of the optical entrance O which is opposite to entrance baffle 11. Thus, entrance baffle 12 is close to mirror M3. Indeed, due to the α-z configuration of system 1, image sensor 2 is located close or very close to optical entrance O, while being offset laterally relative thereto in a direction opposite to mirror M3.

In the y-z plane of [FIG. 3*a*] and [FIG. 3*b*], the entrance field of system 1 is bounded between two field edge marginal rays which are designated by the references $RM_1$ and $RM_2$. The initial segments of these field edge marginal rays $RM_1$ and $RM_2$ therefore form between them the angle of view $\alpha_1$ which was introduced above. Entrance baffle 11 is superimposed on the initial segment of field edge marginal ray $RM_1$, and entrance baffle 12 is superimposed on the initial segment of field edge marginal ray $RM_2$. Furthermore, entrance baffle 11 may extend downstream to the terminal segment of field edge marginal ray $RM_2$, and entrance baffle 12 may extend downstream to the upstream edge $B_{AM3}$ of mirror M3. Put another way, downstream edge $B_{AV11}$ of entrance baffle 11 can be located on the terminal segment of field edge marginal ray $RM_2$, and downstream edge $B_{AV12}$ of entrance baffle 12 can join upstream edge $B_{AM3}$ of mirror M3. Outside the y-z plane of [FIG. 3*a*] and [FIG. 3*b*], entrance baffles 11 and 12 are preferably superimposed on the field edge marginal rays which are close to field edge marginal rays $RM_1$ and $RM_2$.

[FIG. 3*a*] shows the complete paths of field edge marginal rays $RM_1$ and $RM_2$ inside system 1, as well as their contribution to the image formed on photosensitive surface S of image sensor 2. Field edge marginal ray $RM_1$ contributes to the formation of the image at downstream boundary $L_{AV}$ of photosensitive surface S of image sensor 2, and field edge marginal ray $RM_2$ contributes to the formation of the image at upstream boundary $L_{AM}$.

In the y-z plane and with reference to [FIG. 3*b*], reference F0 designates the entrance field of system 1, references F1 and F2 designate angular fields which are external to entrance field F0 but angularly close to it, and references F3 and F4 designate angular fields which are angularly located on opposite sides of fields F1 and F2 respectively, in relation to entrance field F0. Fields F1 and F2 are therefore called neighboring fields to entrance field F0, and fields F3 and F4 are called non-neighboring fields to entrance field F0.

Rays which come from neighboring fields F1 and F2 and which could be reflected by mirror M1, then by mirror M2, and finally by mirror M3, reach the image sensor 2 outside its photosensitive surface S. In principle, rays which originate from non-neighboring fields F3 and F4 do not follow the nominal path inside system 1, successively via the three mirrors, but are either oriented directly towards image sensor 2 if they originate from non-neighboring field F4, or would reach image sensor 2 after reflection on mirror M3 if they originate from non-neighboring field F3 or the mirror Placing the image sensor 2 close to optical entrance O of system 1, as provided by the α-z configuration, makes it possible to prevent stray rays originating from neighboring field F1 from being reflected by mirror M3 towards image sensor 2. The function of entrance baffle 11 therefore comprises the interception of stray rays originating from non-neighboring field F3 which could be reflected by mirror M3 towards image sensor 2, but without including the interception of stray rays originating from neighboring field F1 also towards mirror M3. Due to this, the length of entrance baffle 11 upstream of system 1 can be short.

Entrance baffle 11 also intercepts part of the rays which come from non-neighboring field F4 while being oriented towards image sensor 2, meaning those rays from non-neighboring field F4 which are less inclined relative to the z axis. These are indeed intercepted by the downstream part of entrance baffle 11.

Moreover, those of the rays of non-neighboring field F4 which are the most inclined relative to the z axis while being oriented towards image sensor 2 are intercepted by entrance baffle 12. To intercept these rays, entrance baffle 12 may have an upstream edge $B_{AM12}$ which is upstream of a straight line $D_1$ which connects downstream edge $B_{AV11}$ of entrance baffle 11 to downstream boundary $L_{AV}$ of photosensitive surface S of image sensor 2. However, due to the feature in which mirror M2 intercepts the rays which would otherwise propagate rectilinearly between mirror M1 and image sensor 2, entrance baffle 12 does not need to intercept stray rays from neighboring field F2 which would otherwise be reflected on mirror M1 towards image sensor 2, nor those less inclined rays from non-neighboring field F4. The α-z configuration of system 1 therefore makes it possible, by placing image sensor 2 close to its optical entrance O, to have only the most inclined parasitic rays from non-neighboring field F4 to be intercepted by entrance baffle 12, without requiring entrance baffle 12 to intercept the rays from neighboring field F2 nor the less inclined rays from non-neighboring field F4. The upstream edge $B_{AM12}$ of entrance baffle 12 can therefore be located on line $D_1$ without necessarily extending beyond it upstream. Thus, entrance baffle 12 can also have an upstream length, meaning a length which extends in front of optical entrance O, which is short. Furthermore, it may be sufficient for downstream edge $B_{AV12}$ of entrance baffle 12 to be located on a straight line $D_2$ which connects downstream edge $B_{AV11}$ of entrance baffle 11 to upstream boundary $L_{AM}$ of photosensitive surface S of image sensor 2, instead of joining upstream edge BAMS of mirror M3.

Thanks to the reduced upstream lengths of the two entrance baffles 11 and 12, the entire system 1, including these entrance baffles 11 and 12, therefore has a small size.

[FIG. 4] again corresponds to the embodiment of the invention of [FIG. 2], showing a possible integration of an additional image sensor into the system 1. The reference 13 designates a spectral separation device, for example such as a dichroic separator. Device 13 produces an image PF' of focal plane PF. An additional image sensor 2' can then be arranged so that its photosensitive surface is superimposed on image PF' of the focal plane. As an example, additional image sensor 2' may be silicon-based and sensitive to the range of visible light.

It is understood that the invention can be reproduced while modifying secondary aspects of the embodiments described in detail above, and still retain at least some of the cited advantages. In particular, an imaging optical system according to the invention may be used in applications other than those mentioned. In addition, any numerical values that have been mentioned are for illustrative purposes only, and may be changed according to the particular application. A person skilled in the art will know how to adapt without difficulty the values for the focal length, angle of view, size of entrance pupil, etc., to each application.

The invention claimed is:

1. An imaging optical system comprising three mirrors, including:

a primary mirror, a secondary mirror, and a tertiary mirror which are adapted and arranged so that light rays originating from a scene located in an entrance field of the system are reflected first by the primary mirror, then by the secondary mirror, and then by the tertiary mirror, to form an image of the scene in a focal plane of the system, a light ray which originates from the scene and which contributes to forming the image being thus divided into:

an initial segment upstream of the primary mirror, a first intermediate ray segment between the primary mirror and the secondary mirror, a second intermediate ray segment between the secondary mirror and the tertiary mirror, and a terminal ray segment between the tertiary mirror and the focal plane, and, in the imaging optical system:

the primary and secondary mirrors are oriented so that the second intermediate segment of a parabasal ray of the system intersects the initial segment of said parabasal ray, and the secondary and tertiary mirrors are oriented so that the terminal segment of the parabasal ray is at least partially located at a lateral side of the secondary mirror which is opposite to another side of the secondary mirror on the side of which the primary mirror is located, so that the terminal segment of the parabasal ray does not intersect the first intermediate segment of said parabasal ray, an image sensor arranged so that a photosensitive surface of said image sensor is superimposed on the focal plane, the photosensitive surface extending from an upstream boundary to a downstream boundary, the upstream and downstream boundaries of the photosensitive surface of the image sensor being defined in relation to respective projections of said upstream and downstream boundaries onto the initial segment of the parabasal ray and in relation to the direction of propagation of the parabasal ray in said initial segment of the parabasal ray, an upstream boundary of the photosensitive surface being the point on the photosensitive surface located furthest along a direction opposite to the propagation direction of the initial segment of the parabasal ray, an upstream edge of the primary mirror being the point on the primary mirror located furthest along the direction opposite to the propagation direction of the initial segment of the parabasal ray, an upstream edge of the secondary mirror being the point on the secondary mirror located furthest along the direction opposite to the propagation direction of the initial segment of the parabasal ray, the secondary and tertiary mirrors are oriented so that the upstream boundary of the photosensitive surface of the image sensor is offset along the propagation direction of the initial segment of the parabasal ray relative to a straight line which connects the upstream edge of the primary mirror to:

the upstream edge of the secondary mirror, or an upstream edge of a screen which surrounds the secondary mirror, and the upstream edge of the screen being the point on the screen located furthest along the direction opposite to the propagation direction of the initial segment of the parabasal ray so that:

the secondary mirror or the screen which surrounds said secondary mirror intercepts stray rays which would otherwise propagate in a straight line directly from the primary mirror to the photosensitive surface of the image sensor.

2. The imaging optical system according to claim 1, wherein at least one among the primary mirror, the secondary mirror, and the tertiary mirror has a freeform reflective surface.

3. The imaging optical system according to claim 1, further comprising:

a first entrance baffle which is superimposed on initial segments of first field edge marginal rays, on a same first side of the entrance field as the image sensor, opposite to the tertiary mirror, wherein:

the first entrance baffle has a downstream edge which joins terminal segments of second field edge marginal rays, and the downstream edge of the first entrance baffle is the point on the first entrance baffle located furthest along the propagation direction of the initial segment of the parabasal ray.

4. The imaging optical system according to claim 3, further comprising:

a second entrance baffle which is superimposed on initial segments of the second field edge marginal rays, on a same second side of the entrance field as the tertiary mirror, opposite to the image sensor, wherein:

the second entrance baffle has a downstream edge, the downstream edge of the second entrance baffle is the point on the second entrance baffle located furthest along the propagation direction of the initial segment of the parabasal ray, either the downstream edge of the second entrance baffle is connected to:

an upstream edge of the tertiary mirror, the upstream edge of the tertiary mirror being the point on the tertiary mirror located furthest along the direction opposite to the propagation direction of the initial segment of the parabasal ray, a screen which surrounds said tertiary mirror, an opaque mount for said tertiary mirror, or the downstream edge of the second entrance baffle is offset along the propagation direction of the initial segment of the parabasal ray relative to a straight line which connects the upstream boundary of the photosensitive surface of the image sensor to the downstream edge of the first entrance baffle.

5. The imaging optical system according to claim 4, wherein the upstream edge of the second entrance baffle, which is the point on the second entrance baffle located furthest along the direction opposite to the propagation direction of the initial segment of the parabasal ray, is offset along the direction opposite to the propagation direction of the initial segment of the parabasal ray relative to a straight line which connects the downstream edge of the first entrance baffle to the downstream boundary of the photosensitive surface of the image sensor.

6. The imaging optical system according to claim 1, wherein a longitudinal dimension of the image sensor determines a first angle of view of the system, the system being adapted so that said first angle of view is greater than or equal to 9.

7. The imaging optical system according to claim 6, wherein the image sensor has a matrix arrangement, and a transverse dimension of said image sensor, which is perpendicular to the longitudinal dimension, determines a second angle of view of the system, the system being further adapted so that said second angle of view is greater than or equal to 12°.

8. The imaging optical system according to claim 1, having an aperture number value N which is less than 5, the aperture number N being equal to f/D where f is a focal length f of the system and D is a dimension of an entrance pupil of said system.

9. The imaging optical system according to claim 1, further comprising a pupillary diaphragm, said pupillary diaphragm being located at the primary mirror or at the tertiary mirror.

10. The imaging optical system according to claim 1, further comprising a spectral separation device which is arranged between the tertiary mirror and the image sensor, and an additional image sensor which is arranged in an image of the focal plane of the system, said image having been formed by the spectral separation device.

11. The imaging optical system according to claim 1, wherein the primary, secondary, and tertiary mirrors are contained in a sphere which has a diameter of between 2 and 6 times a value of a focal length f of the system.

12. The imaging optical system according to claim 1, wherein at least one among the primary, secondary, and tertiary mirrors comprises a rigid part made of an injected polymer-based material, and optionally a reflective metal layer.

13. An optronic imaging device, comprising the system in accordance with claim 1, said device being selected among an airborne vehicle homing device, a thermal camera, a vision assistance device, and an optronic pod for surveillance and detection.

* * * * *